Oct. 18, 1949.    G. W. RAYE    2,485,509
REFRIGERATING APPARATUS
Filed July 6, 1943    6 Sheets-Sheet 3

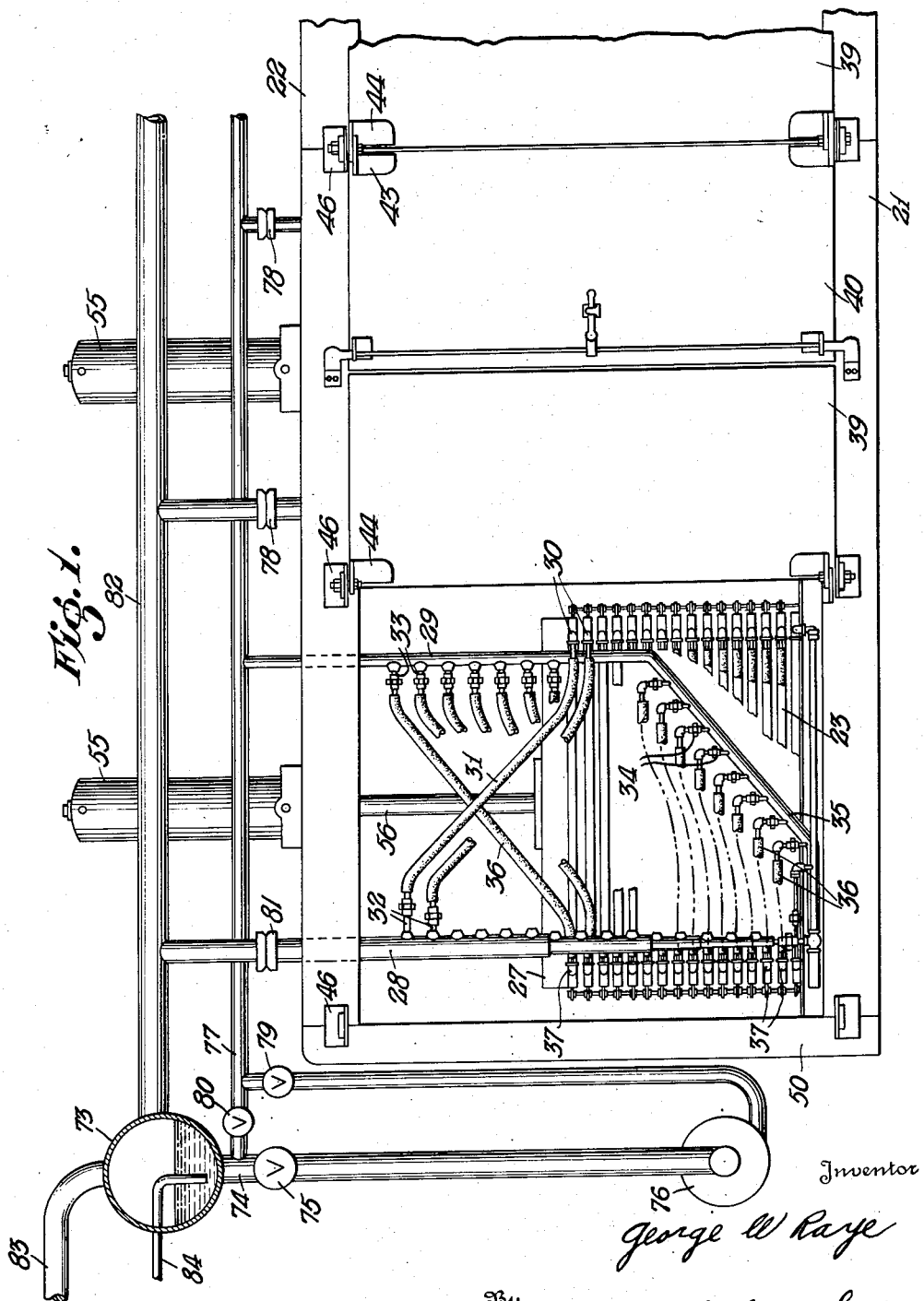

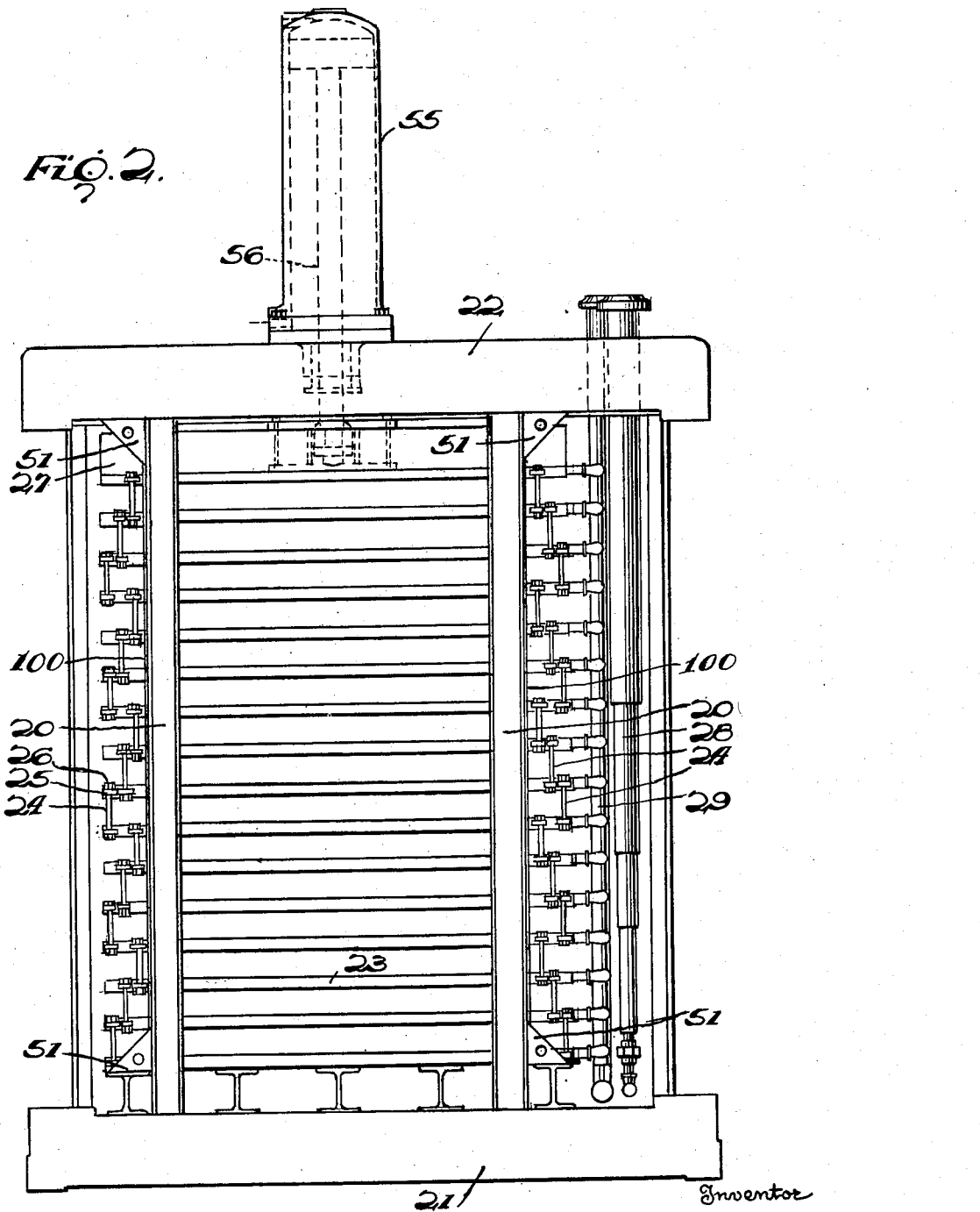

Inventor
George W. Raye.
By Cameron, Kerkam & Sutton.
Attorneys

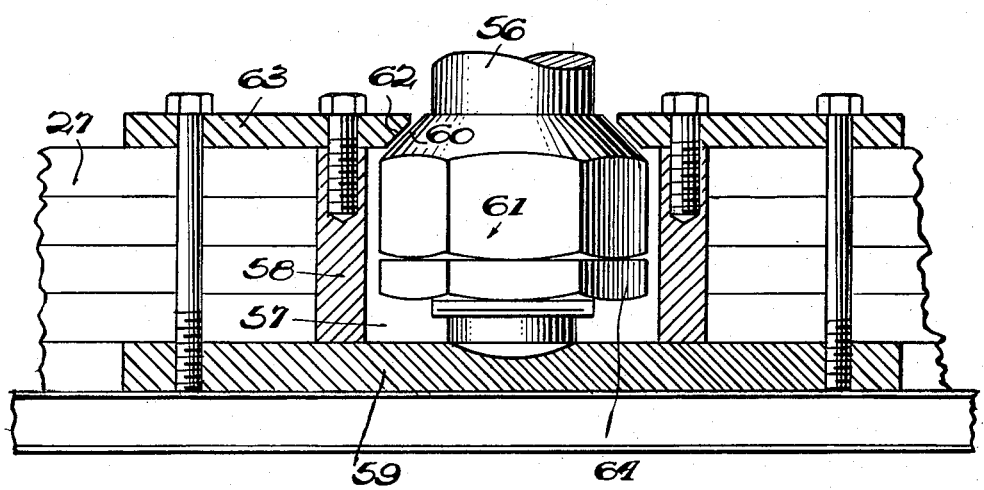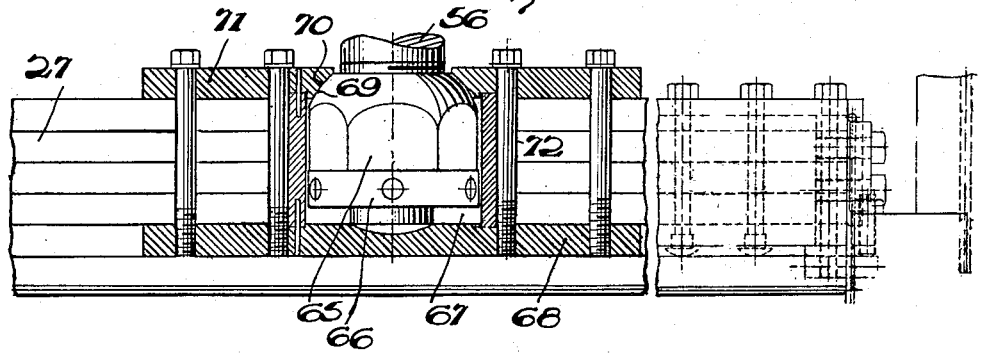

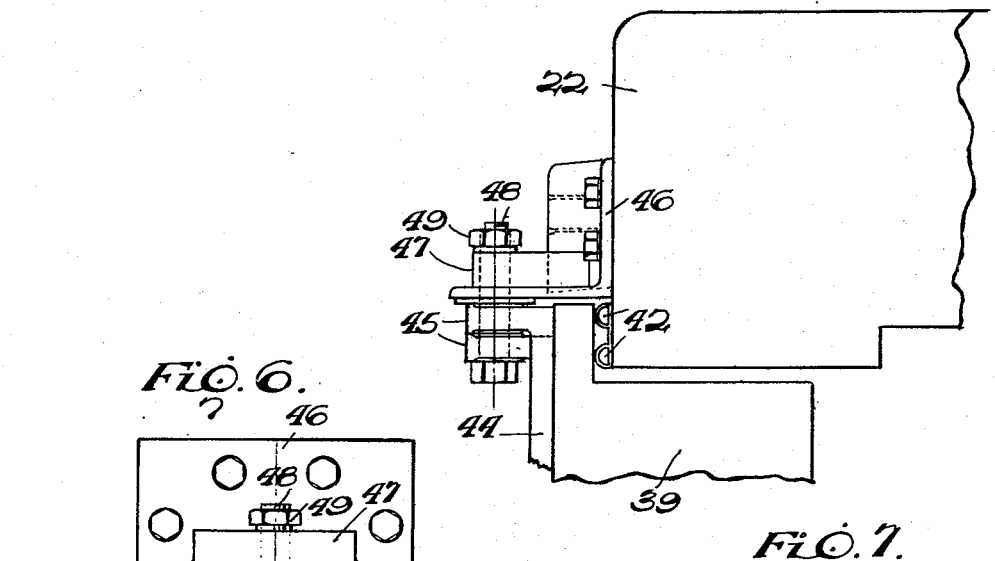
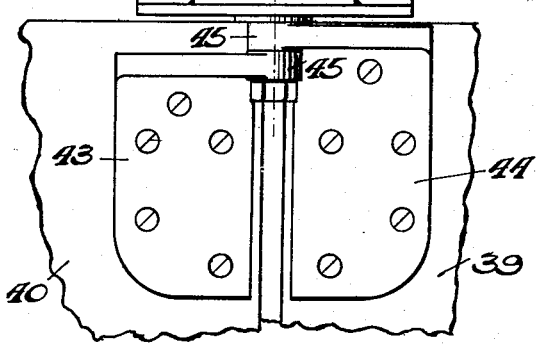
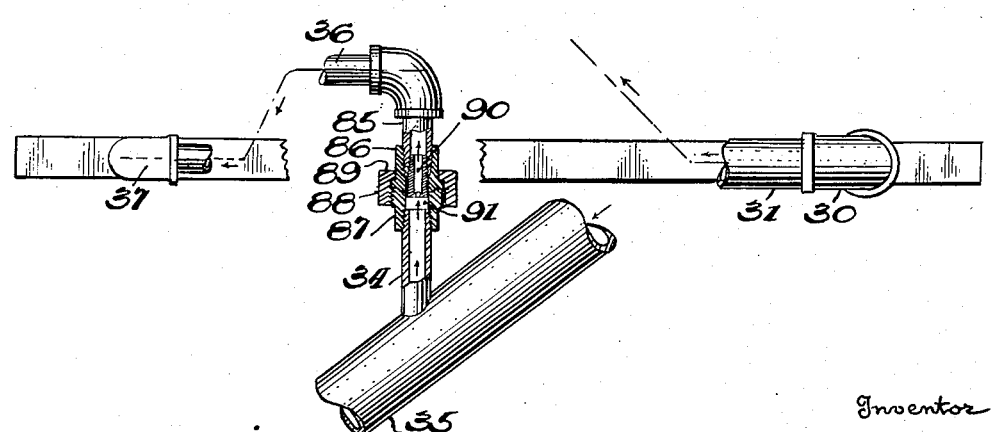

Oct. 18, 1949.   G. W. RAYE   2,485,509
REFRIGERATING APPARATUS
Filed July 6, 1943   6 Sheets-Sheet 6
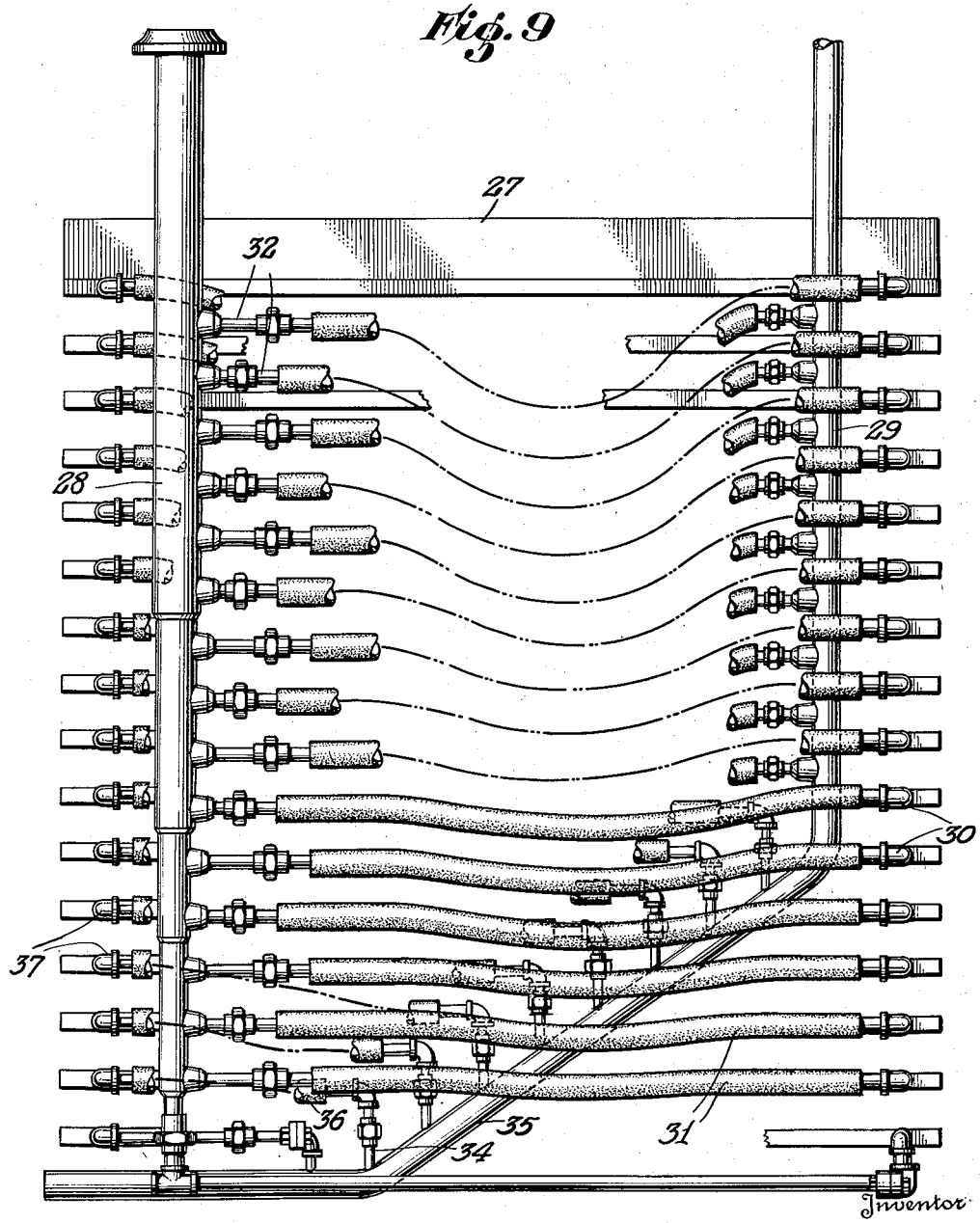

Patented Oct. 18, 1949

2,485,509

UNITED STATES PATENT OFFICE 2,485,509

REFRIGERATING APPARATUS

George W. Raye, Darien, Conn., assignor to General Foods Corporation, New York, N. Y., a corporation of Delaware Application July 6, 1943, Serial No. 493,657

23 Claims. (Cl. 62—114)

1

This invention relates to freezing apparatus of the multiplate type comprising a stack of refrigerated plates movable toward and away from one another, which can be separated or opened to receive products to be frozen between them and then closed to engage the products during freezing.

Apparatus of the above type, usually known as multiplate freezers or frosters, generally comprises portable units which can be moved from place to place as required, so that practical limitations are imposed on the size and weight of the individual units. The practice heretofore, as illustrated for example by Birdseye and Hall Patent No. 1,905,131, has been to mount a single stack of plates in an insulated chamber or casing constituting a separate unit, the refrigerant being supplied either by equipment built integrally with the unit or from an external source such as a refrigerating plant. Refrigerant supply and discharge headers have been installed in the unit one on each of two opposite sides of the stack in order to make room for a series of flexible conduits, one extending from each header to each movable plate, and so that the sets of connections from the supply and discharge conduits to the headers and plates were accessible for service through removable panels or doors on their respective sides of the freezer, while the other two sides were left free for loading and unloading the plates.

Hence, only one stack of plates could be used in each unit, and it was moreover necessary to provide access to all four sides of each unit, with the result that a great deal of space was required for the installation of a number of units. Furthermore, the amount of materials required for the independent casings increased the cost of the machines, and as well the weight of each unit which in turn tended to limit the number of plates and the capacity of the unit.

One of the objects of the present invention is to provide a novel type of multiplate freezer which requires access on only two opposite sides of a stack of plates, so that units may be juxtaposed side by side with consequent substantial savings in space required for a given freezing capacity.

Another object is to provide a novel arrangement of refrigerant headers, conduits and connections to the plates such that both the supply and discharge connections can be located on the same side of the stack, while at the same time the connections between the conduits and the headers and plates are individually accessible.

Another object is to provide a novel multiplate freezer unit which is complete in itself, but which is adapted for assembly with like units to form a common surrounding casing, eliminating the usual side casing walls between the units and reducing the amount of material required and the weight and cost of the apparatus.

A further object is to reduce the stresses on the means for operating the plates whereby further savings in weight, cost and size are effected.

Other objects will appear hereinafter.

One embodiment of the invention has been illustrated in the accompanying drawings, but it is to be understood that said drawings are for purposes of illustration only and are not to be taken as a definition of the limits of the invention, reference being had to the appended claims for this purpose.

In the drawings,

Fig. 1 is a rear view of a refrigerating apparatus embodying the invention;

Fig. 2 is an end view of said apparatus with certain parts removed;

Fig. 4 is a detail section of part of the operating means for the plates;

Fig. 5 is a view similar to Fig. 4 showing a modified form;

Fig. 6 is a fragmentary detail showing the door mounting;

Fig. 7 is an end view of the mounting shown in Fig. 6;

Fig. 9 is a rear view showing the relationship of the refrigerant supply and discharge means; and Fig. 10 is a detail showing part of the refrigerant circulating system.

Figure 8:
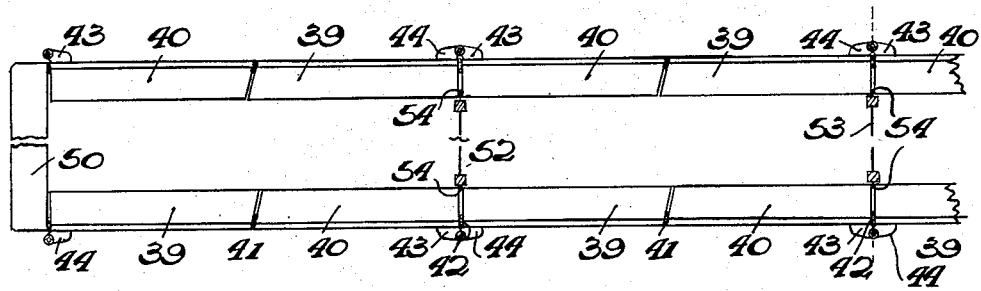
Fig. 8 is a top view partially in section showing the arrangement of the doors.

The drawings illustrate a unit of refrigerating apparatus embodying the invention, together with the manner in which said unit can be assembled with one or more like units as stated above. From this aspect each unit may comprise either one or a plurality of stacks of plates, but in view of the reduction of space and weight accomplished by the invention, each unit preferably comprises two stacks of plates as shown in the drawings.

The apparatus is mounted in any suitable frame which, as shown, comprises the vertical members 20 at the sides and in the middle of the unit. The unit is supported at the bottom on a bed 21 which may be built up in any suitable manner and which includes suitable heat insulating material so that it serves as a bottom casing wall. Similarly the top of the unit is covered by a top 22 which is preferably insulated so that it serves as a top casing wall.

The two stacks of plates are preferably the same in construction and operation and only one need be described. These stacks 23 comprise a suitable number of horizontal plates, here shown as sixteen in number. The lowermost plate is secured in any suitable manner to the supporting framework, and the upper plate is vertically movable by means such as described hereinafter, the plates being interconnected by means limiting the extent of separation between plates but permitting them to aproach one another to engage the product to be frozen. In the form shown, bolts 24 are secured to the edges of each plate at the ends of the stack these bolts extending upward from each plate and being slidable through eyes 25 secured to the edges of the plate immediately above. Thus the plates may move downwardly and approach one another to close the stack, as shown in Fig. 1. On the other hand, when the plates are lifted, the extent of separation between plates is limited by the nuts 26 on the ends of the bolts 24. Accordingly when the top plate is lifted by the platen 27, to which it is secured in any suitable manner, the plates of the stack are picked up in succession and lifted until the open position of the stack is reached as shown in Fig. 9. The vertical movement of the plates is guided by guide bars 100 (Figs. 2 and 3) secured to the uprights 20 which limit sidewise movement of the plates and by pins 101 on the plates which limit movement of the plates at right angles thereto by engagement with the bars.

The plates may be of any suitable type and material, and are arranged to permit the flow of a suitable refrigerant therethrough, such as brine or preferably liquid ammonia. The refrigerant supply and discharge means are all located on one face of the stack which is hereinafter referred to for convenience as the rear face. Hence, either the supply means or the discharge means must be located intermediate the other means and the rear face of the stack, while at the same time the connections must be arranged so as to be accessible for service, repair, etc.

Figure 3:
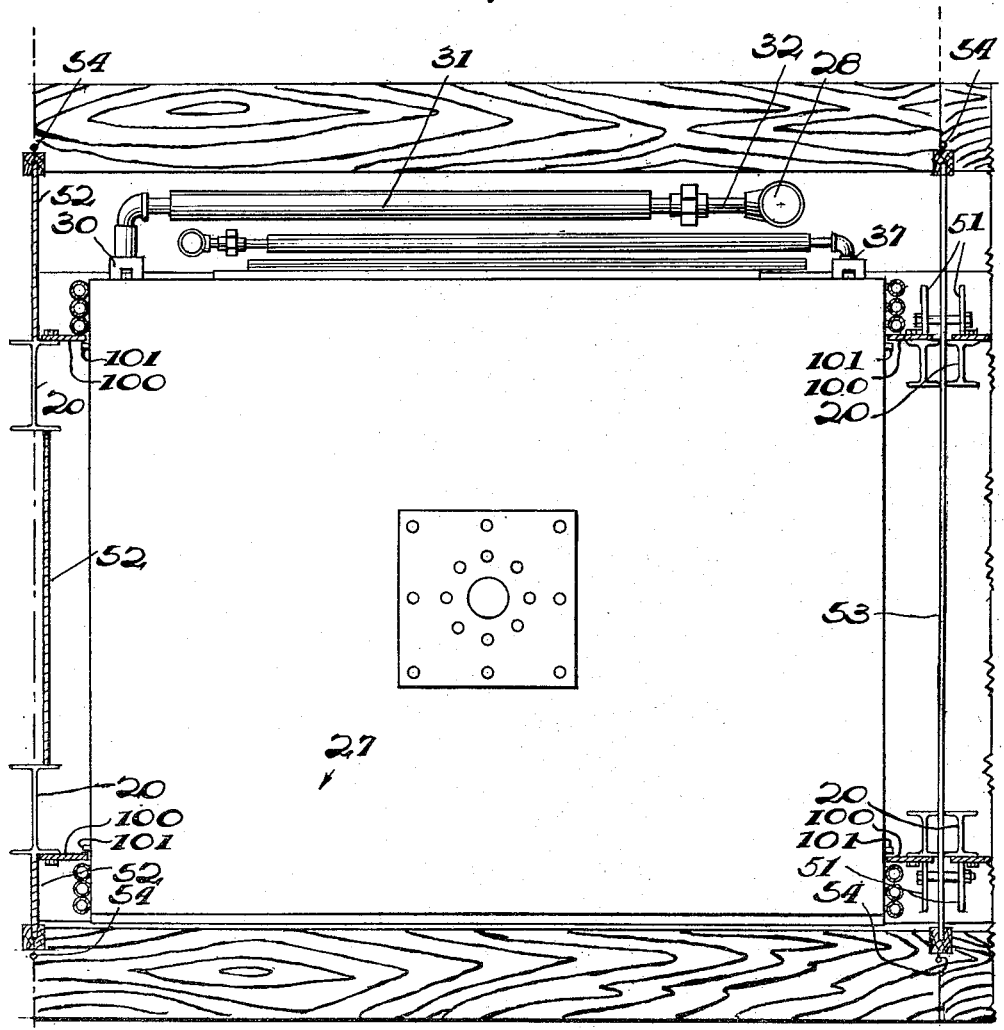
Fig. 3 is a partial plan view of said apparatus with certain parts removed.

In the form shown, the supply means is arranged next to the face of the stack inside the discharge means, the discharge header 28 thus being offset rearwardly with respect to the supply header 29, as shown in Figs. 2 and 3. The two headers are also spaced laterally from one another and the conduits from them to the individual plates extend laterally across the rear face of the stack and in opposite directions from the respective headers, thus providing length to permit necessary movement of the plates relative to the headers.

Referring first to the outer or discharge means, the outlet connections 30 from the individual plates are preferably located on the rear edges of the plates adjacent the corner of the stack, the supply header 29 being inset with respect to said connections. Conduits preferably in the form of flexible hoses 31 (except in the case of the lower plate) extend one from each of the outlet connections 30 to a corresponding nipple 32 on the discharge header 28. It will be observed that the connections of the hoses to the outlets 30 and to the nipples 32 as well are readily accessible from the rear of the stack for tightening, replacement, etc.

The supply header 29 is also provided with a plurality of nipples 33 extending horizontally therefrom, and with a plurality of nipples 34 extending vertically from the lower part 35 of the header, which is inclined downwardly across the rear face of the stack. Conduits preferably in the form of flexible hoses 36 extend one from each of the nipples 33 and 34 to the corresponding inlet connection 37 to one of the plates, said inlet connections being located on the rear edges of the plates adjacent the corner of the stack and the discharge header 28 being inset relatively thereto so that said connections are accessible from the rear of the stack. A baffle 38 may be used between the inner hoses 36 and the plates if desired.

As shown in Fig. 1, the connections of the hoses 36 to the upper group of nipples 33 are also accessible from the rear of the stack when the plates are lowered to closed position, since they are above the discharge hoses 31 and outlet connections 30. The hose connections to the lower group of nipples 34 are inside the discharge hoses, but these connections can be reached between adjacent hoses 31 (see Fig. 9) and since they are vertically disposed, they can be adjusted by swinging a wrench horizontally between adjacent discharge hoses.

Inasmuch as the supply and discharge means are all located at the rear of the stack, leaving its adjacent sides free and requiring no access, it is possible to use two or more stacks of plates in a single unit and also to locate the stacks close together. However, the front and rear walls of the unit casing must permit access to the entire width of the stack, and preferably consist entirely of swingable doors. In the preferred embodiment shown, each wall comprises two pairs of doors 39 and 40 (Figs. 6 and 8) one pair for each stack of plates, and the doors cooperate with each other when closed to form complete front and rear walls without intervening stationary walls, corner posts, or like structural elements, as shown in Fig. 8. The meeting edges of each pair of doors 39, 40 are provided with suitable gaskets 41 and the meeting edges of the adjacent doors of the two pairs with suitable gaskets 42. The doors swing to closed position between the bottom casing wall 21 and top casing wall 22 and complete the enclosure of the unit on four sides.

To simplify the construction and insure proper cooperation between the doors of adjacent pairs, the right hand door 40 of the one pair and the adjacent left hand door 39 of the other pair are preferably hung from common hinge supports. In the form shown, the doors 40 are provided with top and bottom hinge brackets 43 and the doors 39 with top and bottom hinge brackets 44, each pair of brackets 43, 44 providing a pair of vertically aligned eyes 45 one above the other. Hinge supports 46 are secured one to the top casing wall and one to the bottom casing wall, said supports each having an eye 47 (Figs. 6 and 7) aligned with the eyes 45. Hinge pins or bolts 48 extend through the aligned sets of eyes and are held in place by nuts 49 so that the doors are hinged on a common axis.

When the unit described above is to be used alone, the sides of the casing are closed by suitable insulated side panels 50, one of which is shown in Fig. 1. In this case the hinge supports 46 of the end doors 39 or 40 are secured in part to the side panels, assisting in holding these panels in place. When the unit is to be assembled with one or more like units, however, the appropriate side panel is removed and the unit brought into juxtaposition with another unit. It will be observed that the ends or margins of the top and bottom walls 21 and 22 and the hinged edges of the end doors 39, 40 on the front and rear sides of the unit all lie substantially in a vertical plane, thus facilitating the abutment of adjacent units in side by side relation. The hinge supports 46 are then secured in part to the casing of one unit and in part to the casing of the other unit, thus holding the units in assembled relation and insuring proper cooperation of the end doors of the units. The units may also be secured together by any suitable means, as by bolting together the adjacent gussets 51 (Fig. 2) of the two units.

Any suitable locking means can be provided for holding the doors in closed position, together with operating handles of any desired type.

Inasmuch as the doors to all of the stacks may be opened at different times for loading and unloading, it may be desired to provide means for preventing circulation of air through the casing from one stack to another. As shown, this is accomplished by partitions 52 and 53 dividing the casing between adjacent stacks, the partition 52 being interposed between the two stacks of a unit and consisting of three parts separated by the middle uprights 20, and the partitions 53 being interposed between adjacent units. The partition 52 may be suitably secured to the top and bottom casing walls, and the partitions 53 may be held in place by the bolts between the gussets 51. To provide further sealing between stacks, the edges of partitions 52 and 53 may be provided with gaskets 54 adapted to extend between the meeting edges of commonly hinged doors.

The platen 27 of each stack is elevated to open the plates and depressed to close the plates and compress the product to be frozen by suitable hydraulic means including a cylinder 55 mounted on top of the frame and a piston rod 56 extending downwardly from the cylinder and connected to the platen. When the platen is depressed, the top plate may tend to be tilted out of the horizontal due to uneven icing of the plates as between the front and rear thereof, or to possible irregularities in thickness of the product between the plates. With a rigid connection between the platen 27 and the piston rod 56, severe stresses might accordingly be set up in the piston rod and cylinder which would require an unduly heavy construction of these parts and of the supporting frame. Moreover, with such a rigid connection the factors mentioned might result in the application of a non-uniform pressure to the product during freezing.

The present invention eliminates these difficulties and makes possible the use of a lighter construction with consequent savings in weight, cost and size, at the same time insuring a uniform pressure on the product during freezing, by providing a tiltable connection between the piston rod and platen. As shown in Figs. 3 and 4, the lower end of the piston rod 56 is received in a socket 57 defined by a cylindrical wall 58 and a bottom plate 59. The surface of the bottom plate is cupped to receive the correspondingly shaped lower end of the piston rod, thereby providing a pressure transmitting engagement while at the same time permitting relative tilting between these parts. The extent of tilting is controlled by engagement of inclined surfaces 60 of a head 61 carried by the piston rod with the complementary inclined surfaces 62 of an opening in a plate 63 surrounding the piston rod and secured to the top of the platen. The head 61 is preferably threaded on the end of the piston rod so that its position thereon, the clearance between the inclined surfaces, and likewise the amount of tilt permitted can be adjusted, the head being locked in the desired position by a nut 64.

In addition to limiting the amount of tilt, the cooperating inclined surfaces 60 and 62 are brought into engagement when the piston rod is lifted which serves to lift the platen 27 and open the associated stack of plates. Moreover, by making these inclined surfaces of conical shape, the platen tends to be stabilized in a horizontal position while being lifted. Complete stabilization can be effected by the use of a sufficiently large angle of inclination according to the thickness of the plate 63.

Fig. 5 shows a modified form of tiltable connection between the piston rod 56 and platen 27. This modified form comprises a head 65 and lock nut 66 received in a socket 67 corresponding to the socket 57 described above. The tiltable engagement between the lower end of the piston rod and the plate 68 at the bottom of the socket is the same as described above. The inclined surfaces 60 and 62, however, are replaced by cooperating spherical surfaces 69 on the head 65 and 70 on the plate 71 on the top of the platen, the surfaces 69 and 70 being curved about the same center as the cupped surface of the plate 68. In this form the amount of tilt is limited by engagement of the lock nut 66 with the side wall 72 of the socket. Like the inclined surfaces 60 and 62 of Fig. 4, the spherical surfaces 69 and 70 of Fig. 5 engage one another to provide for lifting the platen 27 and opening the stack of plates.

Any suitable refrigerating system can be employed to supply refrigerant for the plates, the nature of which will depend upon the type of refrigerant used. For purposes of illustration, the drawings show part of a liquid ammonia system for supplying any desired number of units and adapted for either forced or gravity circulation. The liquid ammonia supply is contained in an elevated drum 73 with an outlet pipe 74 at the bottom. For forced circulation, a valve 75 in the pipe 74 is opened and the liquid ammonia is circulated by a pump 76 to a supply line 77 connected to the supply headers 29 through coupling 78. In this condition the valve 79 between the pump 76 and the supply line 77 is open, and the valve 80 between the supply line 77 and the drum outlet 74 is closed. When gravity feed is to be used, valves 75 and 79 are closed and valve 80 is opened, thereby connecting the supply line directly to the drum 73.

The discharge headers 28 are connected through couplings 81 with a discharge line 82 leading to the drum 73. Ammonia vapor escapes from the drum by an outlet 83 and liquid ammonia is returned from suitable refrigerating apparatus to the drum by a pipe 84.

In the case of gravity feed, it is desirable to provide means for preventing backflow of ammonia vapor from the plates through the liquid supply hoses and pipes. When the plates full of liquid ammonia are first brought into engagement with the product to be frozen, large volumes of gas are generated in the plates. Since at this time the liquid heads above the inlet and outlet connections to the plates are equal, this gas together with some liquid displaced from the plates tends to escape through the liquid supply header as well as through the discharge header. The back flow of gas through the supply header interferes with the desired supply of liquid ammonia to the plates, and also leaves the plates largely filled with gas whereas it is desirable to maintain a continuous flow of liquid ammonia through the plates. In other words, the flow of liquid ammonia through the plates should be sufficient to replace all evaporation losses and preferably to force a certain amount of liquid ammonia up through the discharge header and back to the drum.

In the form shown, the desired result is obtained by the use of restricted orifices one located in the supply line to each plate. These orifices may be embodied either in the connections of the supply hoses 36 to the supply header 29 or in the inlet connections 37. Fig. 10 shows one of the orifices at the former of these locations, it being understood that like orifices are provided between each plate and the supply header. The nipple 34 is connected to its hose 36 by a vertical union comprising the pipe 85, said pipe and nipple being exteriorly threaded to receive the union members 86 and 87 respectively which are assembled by a nut 88 threaded on one member and having an inturned flange 89 engaging the other member. The orifice member 90 is threaded in the end of the pipe 85 and comprises a tubular member having a closed outer end in which the orifice opening 91 is formed. With this arrangement the orifice opening is accessible for cleaning merely by unscrewing the nut 88. As pointed out above, the openings 91 must be large enough to permit the desired flow of liquid ammonia through the plates, depending on the static head on the orifice as determined by the level of liquid in the drum 73. Generally this condition can be met while still providing sufficient restriction to prevent backflow of gas through the orifice without elevating the drum 73 much above the freezing apparatus.

While only one embodiment of the invention has been described and illustrated in the drawings, it will now be apparent to those skilled in the art that the invention is not restricted to this embodiment but is capable of a variety of mechanical forms, and that various changes may be made in the form, details of construction, and arrangement of the parts without departing from the spirit of the invention. Moreover it will be understood that certain features of the invention may be used or not depending on the conditions of use of the apparatus. Hence reference should be had to the appended claims for a definition of the limits of the invention.

What is claimed is:

1. A refrigerating apparatus comprising a vertical stack of plates separable from one another; laterally spaced refrigerant supply and discharge connections on each of said plates located adjacent opposite sides of said stack at the rear thereof; refrigerant supply and discharge headers inset laterally with respect to said discharge and supply connections respectively, both of said headers being spaced rearwardly of said stack and one of said headers being rearwardly offset with respect to the other; two vertically disposed sets of conduit means extending laterally in opposite directions from said supply and discharge headers to said supply and discharge connections respectively; one of said sets being located intermediate the other set and said stack.

2. A refrigerating unit comprising a vertical stack of plates separable from one another, refrigerant supply and discharge headers at one face of said stack, and conduit means connecting each of said headers to each of said plates, the conduits from one header being disposed outside the conduits from the other header, said one header being inset from one corner of the stack whereby connections from the other header to said plates adjacent their corners are accessible from said one face of the stack, said other header being inset from the other corner of the stack leaving the adjacent corners of the plates unobstructed for connections thereto from said one header.

3. A refrigerating unit comprising walls defining a closed refrigerating chamber, a vertical stack of plates in said chamber and separable from one another, laterally spaced refrigerant supply and discharge headers located at one face of the stack and inset from the corners of the stack, one set of conduits extending from one header laterally across said one face and connected to said plates beyond said other header, and a second set of conduits extending from the other header laterally across said face in the opposite direction and connected to said plates beyond said one header, one set being outside the other.

4. A refrigerating unit comprising a frame, a vertical stack of plates mounted in said frame, said plates being separable from one another and movable downwardly to approach one another to close said stack, laterally spaced refrigerant supply and discharge headers at the rear of the stack and inset from its corners, one of said headers being offset rearwardly relative to the other, a set of conduits extending from the inner header laterally across the rear face of the stack and connected to said plates beyond the outer header, a second set of conduits extending from the outer header laterally across the rear face of the stack and connected to said plates beyond the inner header, the upper connections of said first set of conduits to said inner header being accessible above the second set of conduits when the stack is closed, the lower connections of said first set of conduits to said inner header comprising vertical unions accessible between the conduits of the outer set.

5. A refrigerating unit comprising a frame, a vertical stack of plates mounted in said frame, said plates being separable from one another and movable downwardly to approach one another to close said stack, laterally spaced refrigerant supply and discharge headers at the rear of the stack and inset from its corners, one of said headers being offset rearwardly relative to the other, a set of conduits extending from the inner header laterally across the rear face of the stack and connected to said plates beyond the outer header, a second set of conduits extending from the outer header laterally across the rear face of the stack and connected to said plates beyond the inner header, the upper connections of said first set of conduits to said inner header being accessible above the second set of conduits when the stack is closed, the lower connections of said first set of conduits to said inner header comprising vertical unions aligned in a downwardly inclined direction and each accessible between adjacent conduits of said outer set.

6. A refrigerating unit comprising a frame, a vertical stack of plates mounted in said frame, said plates being separable from one another and movable downwardly to approach one another to close said stack, laterally spaced refrigerant supply and discharge headers at the rear of the stack and inset from its corners, one of said headers being offset rearwardly relative to the other, a set of conduits extending from the inner header laterally across the rear face of the stack and connected to said plates beyond the outer header, a second set of conduits extending from the outer header laterally across the rear face of the stack and connected to said plates beyond the inner header, the upper connections of said first set of conduits to said inner header being accessible above the second set of conduits when the stack is closed, the lower part of said inner header extending laterally across the rear face of the stack on an incline and the lower connections of said first set of conduits to said lower part comprising vertical unions accessible between adjacent conduits of said outer set.

7. A refrigerating unit comprising a vertical stack of plates movable toward and away from each other to open and close the stack, laterally spaced supply inlets and discharge outlets on each of said plates accessible from one face of said stack; laterally spaced refrigerant supply and discharge headers opposed to said one face of said stack crossing the planes of said plates and located within the lateral limits defined by said outlets and inlets, two sets of conduit means associated with and laterally extending in opposite directions from said supply and discharge headers to said supply inlets and discharge outlets respectively, one of said headers and associated conduit means being disposed intermediate the stack and the other header and its associated conduit means, two groups of separable connections between said intermediate header and its associated conduit means, and means for moving said plates to close said stack to wholly expose one of said groups of separable connections.

8. A refrigerating unit comprising walls defining a closed refrigerating chamber, a vertical stack of plates in said chamber and separable from one another, each of said plates having refrigerant supply and discharge connections all located at the rear of said stack, leaving the sides and front of the stack unobstructed, and doors in the front of the chamber, said unit being thereby adapted to be disposed in closely juxtaposed side by side relation with a like unit with said refrigerant supply and discharge connections accessible at the rear.

9. A refrigerating unit comprising a vertical stack of plates separable from one another and each having refrigerant supply and discharge connections located at the rear of said stack, a supporting frame, insulated top, bottom, front and rear casing walls for said stack supported by said frame, at least one of said front and rear walls being formed by swingable doors, and side panels cooperating with the margin of said walls and the edges of said doors to complete a chamber for said stack, one of said side panels being removable whereby said unit is adapted to be assembled side by side with a like unit with the walls and doors cooperating to form a common refrigerating chamber for both units.

10. A refrigerating unit comprising a vertical stack of plates separable from one another and each having refrigerant supply and discharge connections located at the rear of said stack, a supporting frame, top, bottom, front and rear casing walls supported by said frame, at least one of said front and rear walls being formed by swingable doors, side panels cooperating with the margins of said top and bottom walls and the edges of said doors to complete a casing for said unit, and a door hinge support secured partly to said casing and partly to one of said side panels, said one side panel being removable whereby said unit is adapted to be assembled side by side with a like unit with the top and bottom walls and doors cooperating to form a common refrigerating chamber for both units and with said hinge support secured in part to the two casings in the assembly.

11. In a refrigerating apparatus, a plurality of freezing units each having a vertical stack of plates separable from one another, refrigerant supply and discharge connections to each plate disposed on the rear faces of the stacks, each unit having insulated top, bottom and rear casing walls and swingable doors forming a front casing wall, said units being assembled side by side with said walls and doors of adjacent units cooperating to form a refrigerated chamber, the doors of adjacent units meeting edge to edge with a common hinge support therefor, and side panels covering the open sides of the end units and completing said chamber.

12. In a refrigerating apparatus, a plurality of separate freezing units each having a vertical stack of plates separable from one another, refrigerant supply and discharge connections to each plate disposed on the rear faces of the stacks, a casing for each unit comprising top, bottom and rear casing walls and swingable doors forming a front casing wall, said units being juxtaposed side by side with said walls and doors of the several units cooperating to form a common refrigerated chamber for all units, the doors of adjacent units meeting edge to edge with a common hinge support therefor secured to and connecting the adjacent casings, and side panels covering the open sides of the end units and completing said chamber.

13. A refrigerating apparatus comprising a frame, a plurality of vertical stacks of plates, the plates of each stack being separable from one another and said stacks being mounted in said frame side by side, an insulated casing carried by said frame and enclosing said stacks, refrigerant supply and discharge connections to each plate, all of said connections being disposed on the rear faces of the stacks and accessible from the rear of the casing leaving their side and front faces unobstructed, said stacks being arranged with their adjacent side faces closely juxtaposed and with the outer side faces of the end stacks closely juxtaposed to the side walls of said casing, and doors in the front of the casing through which the stacks may be loaded and unloaded at their front faces.

14. A refrigerating apparatus of the type having a gravity flow vaporizable refrigerant system, comprising a plurality of horizontally disposed relatively movable plates mounted one above the other in a stack, refrigerant supply inlet means and refrigerant outlet means for each of said plates in said system, and orifice means associated with each of said inlet means and having an orifice opening of restricted area as compared with said inlet means, for preventing the backflow of vapor from said plates and said inlet means.

15. In a refrigerating apparatus, a plurality of freezing units each having a vertical stack of plates separable from one another, refrigerant supply and discharge connections to each plate, said connections all disposed on the rear faces of the stacks, each unit having insulated top, bottom, front and rear walls and said units being assembled side by side with said walls forming a common insulated chamber for all the units, at least one of said front and rear walls of each unit being formed by swingable doors and the edges of the doors of adjacent units being juxtaposed, a partition dividing said chamber between adjacent units and having a gasket in sealing relation between said juxtaposed edges, and side panels covering the open sides of the end units and completing said chamber.

16. In a refrigerating apparatus, a sectional casing composed of a plurality of units each having insulated top, bottom, front and rear walls, said units assembled side by side with corresponding walls abutting to form a common insulated chamber, side panels covering the open sides of the end units to complete said chamber, each unit comprising a vertical stack of plates separable from one another and refrigerant supply and discharge connections to each plate, all of said connections being disposed on the rear faces of the stacks leaving their side and front faces unobstructed, said stacks throughout said common chamber being arranged with their adjacent side faces closely juxtaposed and with the outer side faces of the end stacks closely juxtaposed to said side panels, and doors in said front casing walls through which the stacks may be loaded and unloaded at their front faces.

17. A refrigerating apparatus comprising a purality of horizontally disposed vertically separable plates mounted one above another in a stack, means interconnecting the edges of said plates and limiting their maximum vertical separation from one another in loading positions, vertically movable power operated means located above said stack for effecting relative movement of said plates, said interconnecting means being constructed and arranged so that said plates are capable of tilting independently into non-parallel positions relative to one another when moved toward one another from said loading positions to freezing positions, and connecting means intermediate said power operated means and the uppermost plate comprising a tilting connection therebetween and means for limiting tilting movement of said uppermost plate relative to said power operated means.

18. A refrigerating apparatus comprising a plurality of horizontally disposed vertically separable plates mounted one above another in a stack, means interconnecting the edges of said plates and limiting their maximum vertical separation from one another in loading positions, vertically movable power operated means opposed to one end of the stack for effecting positive relative movement of said plates from said loading positions, said interconnecting means being constructed and arranged so that said plates are capable of tilting independently into non-parallel positions relative to one another when so moved, and connecting means between said power operated means and the plate at said one end comprising a tilting connection therebetween and means for limiting tilting movement of said end plate relative to said power operated means.

19. A refrigerating apparatus comprising a plurality of horizontally disposed vertically separable plates mounted one above another in a stack, means interconnecting the edges of said plates and limiting their maximum vertical separation from one another in loading positions, vertically movable power operated means located above said stack for effecting positive relative separation of said plates to said loading positions and positive relative movement of said plates toward one another to freezing positions, said interconnecting means being constructed and arranged so that said plates are capable of tilting independently into non-parallel positions relative to one another when so moved toward one another, and connecting means between said power operated means and the uppermost plate comprising an operating member having its end housed in a socket on said uppermost plate, said member and socket having cooperating substantially spherical surfaces for transmitting downward thrust from said member to said plate while enabling tilting movement therebetween and other cooperating parts engageable to limit tilting movement and to lift said uppermost plate.

20. A refrigerating apparatus as defined in claim 19, said cooperating parts comprising complementary inclined surfaces spaces during downward thrust to limit tilting movement and engageable during lift to stabilize said uppermost plate against tilting.

21. A refrigerating apparatus as defined tin claim 19, said cooperating parts comprising a part on said member engageable with the wall of the socket to limit tilting movement and also complementary spherical surfaces for lifting said uppermost plate.

22. A refrigerating unit comprising walls defining a refrigerating chamber, a stack of superposed vertically separable plates in said chamber, refrigerant supply and discharge headers lodated at the rear of said stack, refrigerant supply and discharge connections between said headers and each plate comprising supply and discharge conduits extending from the respective headers in opposite directions across the rear face of said stack to said plates, leaving the sides and front of said stack unobstructed, and doors in the front of said chamber, said unit being thereby adapted to be disposed in closely juxtaposed side by side relation to a like unit with said refrigerant supply and discharge connections accessible at the rear.

23. A refrigerating unit comprising walls defining a refrigerating chamber, a plurality of horizontally disposed vertically separable plates arranged in a stack in said chamber, refrigerant supply and discharge headers located at the rear of said stack spaced from the corners thereof, and refrigerant supply and discharge connections between said headers and each plate comprising two sets of conduits extending laterally in opposite directions from said headers across the rear face of said stack and connected to said plates adjacent the opposite rear corners thereof, leaving the sides and front of the stack unobstructed, said unit being thereby adapted to be disposed in closely juxtaposed side by side relation to a like unit with said refrigerant supply and discharge connections accessible at the rear.

GEORGE W. RAYE.

REFERENCES CITED

The following references are of record in the file of this patent:

UNITED STATES PATENTS

| Number | Name | Date |
|---|---|---|
| 1,822,123 | Birdseye | Sept. 8, 1931 |
| 1,849,885 | Priess | Mar. 15, 1932 |
| 1,905,131 | Birdseye | Apr. 25, 1933 |
| 2,218,632 | Baird | Oct. 22, 1940 |
| 2,232,383 | Greig | Feb. 18, 1941 |
| 2,279,945 | Hoffman | Apr. 14, 1942 |
| 2,283,923 | Hall | May 26, 1942 |

FOREIGN PATENTS

| Number | Country | Date |
|---|---|---|
| 285,505 | Italy | May 31, 1931 |